(12) United States Patent
Boettigheimer et al.

(10) Patent No.: US 11,831,168 B2
(45) Date of Patent: Nov. 28, 2023

(54) GROUND ASSEMBLY FOR AN INDUCTIVE CHARGING DEVICE

(71) Applicant: MAHLE International GmbH, Stuttgart (DE)

(72) Inventors: Mike Boettigheimer, Kornwestheim (DE); Thomas Himmer, Reichenbach (DE); Christopher Laemmle, Stuttgart (DE); Martin Steinbach, Waiblingen (DE); Holger Schroth, Maulbronn (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/961,483

(22) Filed: Oct. 6, 2022

(65) Prior Publication Data

US 2023/0112321 A1 Apr. 13, 2023

(30) Foreign Application Priority Data

Oct. 7, 2021 (DE) .......................... 102021211348.6

(51) Int. Cl.
*H02J 50/00* (2016.01)
*H02J 7/00* (2006.01)
(Continued)

(52) U.S. Cl.
CPC .......... *H02J 50/005* (2020.01); *H02J 7/0042* (2013.01); *H02J 50/10* (2016.02); *B60L 53/122* (2019.02)

(58) Field of Classification Search
CPC ........ H02J 50/005; H02J 7/0042; H02J 50/10; H02J 2310/48; B60L 53/122;
(Continued)

(56) References Cited

U.S. PATENT DOCUMENTS 9,550,427 B2 * 1/2017 Takeshita ................ H01F 27/02
10,447,086 B2 * 10/2019 Yuasa ...................... H01F 27/02
(Continued)

FOREIGN PATENT DOCUMENTS

DE 102018215224 A1 12/2019
DE 102018215174 A1 3/2020
(Continued)

OTHER PUBLICATIONS

English for abstract DE-102018215174.
(Continued)

*Primary Examiner* — Jared Fureman
*Assistant Examiner* — Michael J Warmflash
(74) *Attorney, Agent, or Firm* — Fishman Stewart PLLC

(57) ABSTRACT

A ground assembly for an inductive charging device for inductively charging a motor vehicle parked on a surface may include a base plate, a flat coil, a core body, a lower hollow space, a support, and a heat-conducting jacket. The base plate may be formed as a cooling plate. The flat coil may include a helically wound conductor. The flat coil may be arranged spaced apart from the base plate. The lower hollow space may be defined between the core body and the base plate. The support may be disposed between the core body and the base plate, and may extend through the lower hollow space. The heat-conducting jacket may connect the core body and the base plate in a heat-transmitting manner, and may surround the at least one support in a jacket-like manner.

20 Claims, 2 Drawing Sheets

(51) Int. Cl.
*H02J 50/10* (2016.01)
*B60L 53/122* (2019.01)

(58) Field of Classification Search
CPC ........ B60L 53/302; B60L 53/12; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 2013/0181667 A1* | 7/2013 | Takeshita | H01F 38/14 320/108 |
| 2017/0237295 A1* | 8/2017 | Yuasa | B60L 53/122 307/104 |
| 2022/0103012 A1* | 3/2022 | Himmer | H01F 27/025 |
| 2023/0111330 A1* | 4/2023 | Boettigheimer | H02J 50/10 320/109 |

FOREIGN PATENT DOCUMENTS

| | | |
|---|---|---|
| DE | 102020202840 A1 | 9/2021 |
| DE | 102020212388 A1 | 3/2022 |
| EP | 3282460 A1 | 2/2018 |

OTHER PUBLICATIONS

English abstract for DE-102018215224.
English abstract for DE-102020202840.
German Search Report for DE-102021211348.6, dated Jul. 22, 2022.

* cited by examiner

GROUND ASSEMBLY FOR AN INDUCTIVE CHARGING DEVICE

CROSS-REFERENCE TO RELATED APPLICATIONS

This application claims priority to German Patent Application No. DE 10 2021 211 348.6, filed on Oct. 7, 2021, the contents of which is hereby incorporated by reference in its entirety.

TECHNICAL FIELD

The present invention relates to a ground assembly for an inductive charging device for inductively charging a motor vehicle.

BACKGROUND

In at least part-electrically driven motor vehicles, a regular charging of an electrical energy store of the motor vehicle is necessary. For this purpose, a direct electrical connection between the motor vehicle and an external electric energy source, for example a power connection, can be generally established. However, this requires a manual activity of a user.

Further it is known to inductively charge the motor vehicle, that is in particular its electric energy store. In a ground assembly outside the motor vehicle a primary coil is located for this purpose which inductively interacts with a secondary coil in the motor vehicle. During the operation of the charging device, the motor vehicle to be charged is situated on a surface above the ground assembly, which is why the ground assembly has to be configured in such a manner that it can support the load of the motor vehicle to be charged. Because of the charging power to be produced, heat can develop in the ground assembly during the operation of the charging device, which can be up to 10% of the electrical charging power and lead to an undesirable temperature increase of the ground assembly and connected to this also to a failure of the electrical and/or electromagnetic components.

In order to be able to absorb the mechanical and thermal loads it is known in known ground assemblies that load-critical components are designed very solid and thus over-dimensioned or subjected to thermal monitoring in order to reduce the charging power upon overheating. This is called derating by the person skilled in the art. Alternatively, an active cooling is also conceivable wherein effective heat sinks are frequently made of metal and can thus interfere with a magnetic field and render their arrangement difficult. In addition, such an active cooling is complicated and expensive.

SUMMARY

The present invention therefore deals with the problem of stating for a ground assembly for an inductive charging device of the type mentioned at the outset an improved or at least another embodiment which overcomes in particular the disadvantages known from the prior art.

According to the invention, this problem is solved through the subject matter of the independent claim(s). Advantageous embodiments are the subject matter of the dependent claim(s).

The present invention is based on the general idea of increasing a power transmission during the charging of an electric vehicle by means of a ground assembly according to the invention having a base plate and a core body supported above the said base plate via at least one support and a flat coil in that a conducting heat-conducting element is provided, via which a heat dissipation to the base plate formed in particular as cooling plate and thus a cooling of for example a flat coil by way of the at least one support is possible and thereby a heat dissipation or a cooling of the flat coil and the core body can be improved as a result of which a higher charging power with same conductor cross-section or a same charging power with reduced conductor cross-section becomes possible. For the heat dissipation of the at least one core body a heat-conducting element formed as a heat-conducting jacket is at least provided, wherein the heat-conducting jacket connects the core body and the base plate in a heat-transmitting manner and surrounds at least one support in the manner of a jacket. By way of this, the heat-conducting jacket formed for example as metal film together with the support, which can be formed for example from plastic, can be arranged in a central region of the core body to be supported, as a result of which on the one hand an optimised load discharge from the core body, for example a ferrite body, into the associated support and at the same time an optimised heat dissipation of the core body can be achieved without the heat-conducting jacket interfering with a magnetic field in the core body, since the same is comparatively low in the central region. The ground assembly according to the invention for an inductive charging device for inductively charging a motor vehicle parked on a surface has the previously mentioned base plate formed in particular as cooling plate, for example an aluminium plate, which extends plate-like transversely to a distance direction. Likewise, the ground assembly according to the invention possesses at least one flat coil which comprises a helically wound conductor and is arranged in the distance direction spaced apart from the base plate, i.e. above the same. Furthermore, the ground assembly according to the invention comprises at least one core body which extends plate-like transversely to the distance direction and is formed for example as ferrite body. Between the at least one core body and the base plate, a lower hollow space is formed in which for example a cooling air can flow and/or electric components can be arranged. Between the at least one core body and the base plate, at least one support is provided which in the distance direction extends through the lower hollow space, wherein at least one heat-conducting jacket is provided which connects the core body and the base plate in a heat-transmitting manner and surrounds at least one support jacket-like. Because of the selected arrangement of the heat-conducting jacket round about the support, the lower hollow space present between the individual supports and between the core body and the base plate can be kept free of heat-conducting elements, as a result of which a comparatively large installation space that can be freely equipped materialises here. Because of the heat-conducting jacket provided according to the invention, a ground assembly with a high charging power is also possible since the core bodies, for example ferrite plates, can be subjected to heat dissipation with a high cooling output. In addition, the ground assembly according to the invention is not very complex, i.e. constructed in a simple manner and because of this can be produced cost-effectively and easily. When the at least one support additionally is arranged in a central region of the respective core body, neither the said support, provided it is formed from metal for example, nor the heat-conducting jacket surrounding the said support, influences the magnetic field in the core body as a result of which no negative interactions have to be anticipated. By arranging the support in the central region of the respective associated core body, a pure pressure loading in the core bodies can also be preferentially created, which is favourable in terms of load since such core bodies, for example ferrites, are extremely pressure-resistant but bending-sensitive at the same time. Here, the support can be arranged transversely to the distance direction within such a central region of an associated core body, wherein the central region amounts to for example 80% of a diameter of the respective associated core body each in the longitudinal direction and width direction, preferentially 70% of the diameter of the individual core bodies each in the longitudinal direction and in the width direction, particularly preferably 50 or even 30% of the diameter of the individual core bodies each in the longitudinal direction and width direction.

The ground assembly according to the invention can be arranged recessed into a surface, in particular flush with the surface of the same, wherein alternatively an arrangement on the ground is obviously also conceivable.

In an advantageous further development of the solution according to the invention, the heat-conducting jacket is made of a material having a heat conductivity of $\lambda > 50$ W/(m·K), in particular a heat conductivity of $\lambda > 100$ W/(m·K). Thus, for example aluminium with a heat conductivity of $\lambda > 235$ W/(m·K) can be possible as material for the respective heat-conducting jackets. Practically, the at least one support is formed from plastic. Such a formation from plastic makes possible a light-weight design of the ground assembly according to the invention, which in particular greatly simplifies maintenance operations. Despite this, such plastic supports can have high loadbearing capacities and therefore absorb the mechanical loads that occur when being driven over without problems.

Alternatively, the at least one support is at least partially formed made of metal, in particular of aluminium. Again alternatively it is also conceivable that the at least one support is partly designed made from graphite or from ceramic in particular from aluminium nitride or aluminium silicide. Graphite has a heat conductivity $\lambda$ of 15 to 20 W/(m·K), while an aluminium nitride ceramic can even have a heat conductivity $\lambda$ of 180 W/(m·K). The use of in particular such aluminium nitride ceramics is of great interest in particular where a lot of heat has to be dissipated, but a material may not be electrically conducting under certain conditions. With a possible positioning in the central region it is possible to employ metallic supports both for the load discharge and also for the heat dissipation and thus for heat dissipation or cooling of the flat coil or of the core arrangement without, or with only marginal influence on the magnetic field.

In a further advantageous embodiment of the ground assembly according to the invention, the heat-conducting jacket comprises copper, aluminium and/or graphite. Even this non-conclusive listing shows the manifold possibilities for the material of the heat-conducting jacket that are available, since the same does not have to bring about any supportive function whatsoever, but merely a heat-conducting function and thus a heat dissipation of the core bodies or a cooling of the same.

Particularly metals such as aluminium and copper have a high heat conductivity and thus a high possibility of cooling the core bodies through heat dissipation via the heat-conducting jackets into the base plate. Additionally or alternatively, the heat-conducting jacket can also be formed as a film, as a result of which a particularly thin and also weight-optimised formation is possible. Since in particular aluminium has a high heat conductivity of approximately 235 W/(m K), the heat-conducting jacket can be formed out of a comparatively thin material and still assume its heat-conducting function without problem.

Practically, the heat-conducting jacket is connected to at least one of the following components in a heat-transmitting, in particular flat manner: base plate, support, core body. By way of this, an optimised heat dissipation from the core body, for example the ferrite plate, either directly via the heat-conducting jacket into the base plate or in the case of a flat connection to the support, also via the support into the base plate.

In a further advantageous embodiment of the assembly according to the invention, the heat-conducting jacket is connected via a thermal interface material (TIM), in particular via an adhesive, a heat-conductive paste or an adhesive film with a heat conductivity of $\lambda > 0.8$ W/(m·K) with at least the base plate and/or the core body or the support. When as heat-conducting jacket for example an aluminium film is used, merely a high heat transfer has to be considered when connecting to the base plate that is preferentially likewise formed from aluminium, while when connecting the heat-conducting jacket formed as aluminium film to the core body formed as ferrite body, a corrosion problem also has to be considered, so that in this case a connection via such a thermal interface material is a major advantage since between the heat-conducting jacket and the core body there is no direct contact so that no contact corrosion can occur.

Practically, a pin projecting in the distance direction is provided on the base plate and an opening formed complementarily thereto is provided on the associated support. Preferentially, the pin can engage in the opening of the support in a positive-locking manner so that with a suitable cross-sectional shape of the pin a predefined angle of rotation position of the support can be enforced. When the pin is for example round and the associated complementary opening likewise, the support can be twisted relative to the pin via its axis, which is not possible when the pin for example has an angular outer cross-section and the opening an angular inner cross-section formed complementarily thereto. By configuring the pin and the opening in such an angular way it is not only possible to orient the support relative to the base plate but at the same time also the heat-conducting jacket, which is advantageous in particular when the upper termination of the heat-conducting jacket forms or approximately forms the geometrically flat extent of the core body in its installation position. The pin and the associated opening secure the support transversely to the distance direction.

In a further advantageous embodiment of the ground assembly according to the invention, the flat coil comprises a stranded wire carrier which possesses at least one pressure pedestal arranged co-axially to an associated support, via which the stranded wire carrier is supported on an associated core body. The pressure pedestal is arranged co-axially to the support with respect to an axis extending in the distance direction as a result of which it is possible to introduce loads, such as for example from motor vehicles driving on the ground assembly, exclusively as pressure loads and not as bending loads into the core body and from these into the respective supports. Since in particular ferrite is extremely pressure-resistant, a core body consisting of such a material can very favourably absorb a pure pressure load. Round about the pressure pedestal, the stranded wire carrier, in particular a lower stranded wire carrier is offset from the respective core body, i.e. spaced apart in the distance direction, so that a load introduction into the core body takes place exclusively via the pressure pedestal. Because of this, both the mechanical load capacity and also the charging power of the ground assembly can be significantly increased.

In an advantageous further development, the base plate comprises at least one cooling channel for a coolant. Because of this, an active cooling of the base plate is possible during the operation, wherein the heat-conducting supports also bring about a cooling of the core arrangement or of the core body and of the flat coil arranged above the base plate in the installed state at the same time. In addition, the actively cooled base plate in turn cools the air within the lower hollow space, as a result of which a cooling of electronics arranged there as well as an air-cooling of the core arrangement or core bodies arranged above the lower hollow space is also possible. Regions, on which the respective supports are supported on the base plate, preferentially do not have any cooling channels in order to be able to ensure an adequate pressure stability.

The base plate itself is advantageously formed of a metal or of a metal alloy, for example aluminium, in order to improve a heat transmission between coolant, base plate, air and supports. Through the arrangement of the base plate spaced apart from the flat coil and the core arrangement, an electromagnetic interaction of the base plate with the flat coil and the core arrangement is additionally minimised or at least reduced. A distance of the base plate from the core arrangement in the distance direction can amount to between multiple millimetres and multiple centimetres. By producing the base plate from metal or a metal alloy, an electromagnetic shielding of the ground assembly downwards towards the ground takes place at the same time.

Practically, a distributor plate is arranged between at least one support and an associated core body. Such a distributor plate can ensure an improved heat transmission and thus an improved cooling of the core arrangement, wherein it is obviously clear that the distributor plate is also arranged within the central region in order to at least minimise in particular influencing the magnetic field and thus generating eddy current losses. In addition, the distributor plate with a thickness <2 mm is very flat and arranged closely below the core arrangement. In this region directly below and spaced apart from the distance regions of the core arrangement, the magnetic flux density compared with the region between the individual core bodies and also in the edge region of these is significantly lowered so that by using electrically conducting materials for the distributor plate no major additional losses through eddy currents or hysteresis effects materialise while the influence on the magnetic field is very low and thus negligible.

In a particularly advantageous embodiment of the ground assembly according to the invention, the distributor plate is connected to the core arrangement via an adhesive layer having a heat conductivity of $\lambda > 0.8$ W/(m·K) and/or a shear modulus of G<10 MPa. Since the adhesive layer is extremely thin, a reduced heat conductivity of $\lambda > 0.8$ W/(m·K) is sufficient. In order to be able to compensate for different thermal expansion coefficients between the core bodies, for example a ferrite plate and the distributor plate, it is additionally advantageous to furnish the adhesive layer with a shear modulus G<10 MPa.

Practically, at least one support penetrates the base plate. Such a variant offers the major advantage that through a punctual mounting of the entire ground assembly on a surface that may be uneven, an unevenness can be compensated for by punctual measures such as for example a punctual mortar bed, without forced stresses on the structure of the ground assembly being created by this. If required, a housing structure of the ground assembly can thus be also configured simpler and more cost-effectively. For a particularly simple assembly it is additionally conceivable that the supports, prior to placing the ground assembly, are mounted and levelled on the ground accurately in position. For reinforcing the mechanical support pillars, i.e. the supports, a connection can also be supported through further connecting means, such as for example screws. For absorbing lateral loads, for example resulting from a start-up of a motor vehicle, the ground assembly can be additionally fixed in the ground all-round in at least three, preferentially in four to eight points circumferentially over the circumference of the ground assembly by means of bolts.

Practically, at least one heat-conducting jacket is formed cup-shaped, with a base arranged between core body and support, a jacket lying flat against the support in particular in a heat-transmitting manner and an edge lying flat against the base plate in a heat-transmitting manner. Through such a cup-shaped formation of the heat-conducting jacket a reliable sealing of the ground assembly can be created, as a result of which in particular the support penetrating the base plate described in the preceding paragraph can also be realised. Here, the cup-shaped heat-conducting jacket with its preferentially circular edge is tightly connected to the base plate, for example soldered, and thus likewise connected so as to be optimised in a heat-transmitting manner. Between the support and the bottom of the heat-conducting jacket or between the bottom of the heat-conducting jacket and the core body, a heat-conductive paste, a heat-conductive pad or a heat conducting distributor plate can also be arranged.

Practically, an air flow path leads through the lower hollow space. By way of this, a further improved cooling of the core body delimiting the lower hollow space towards the top can be achieved since these can be cooled by way of cooling air flowing in the air flow path. Through the configuration of the at least one heat-conducting jacket according to the invention directly as the jacket surrounding the respective support, the lower hollow space also remains free of heat-conducting elements so that the same can be effectively utilised for the arrangement for example of electronic components.

In a further advantageous embodiment of the ground assembly according to the invention, the same comprises a cover plate on a side of the flat coil facing away from the base plate and arranged spaced apart in the distance direction from the same, wherein between the flat coil and the cover plate a circuit board is arranged. By way of this, an installation space-optimised housing of electronic components such as for example circuit boards is conceivable.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows, in each case schematically

DETAILED DESCRIPTION

Figure 1:
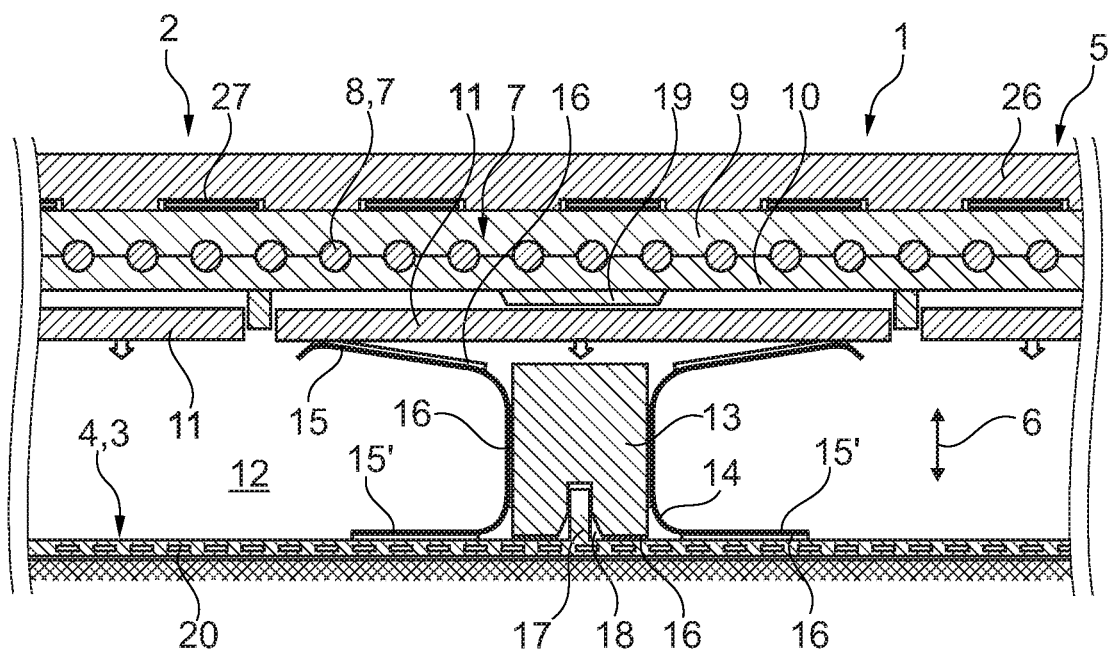
FIG. 1 shows a section through a ground assembly of an inductive charging device according to the invention.
Figure 2:
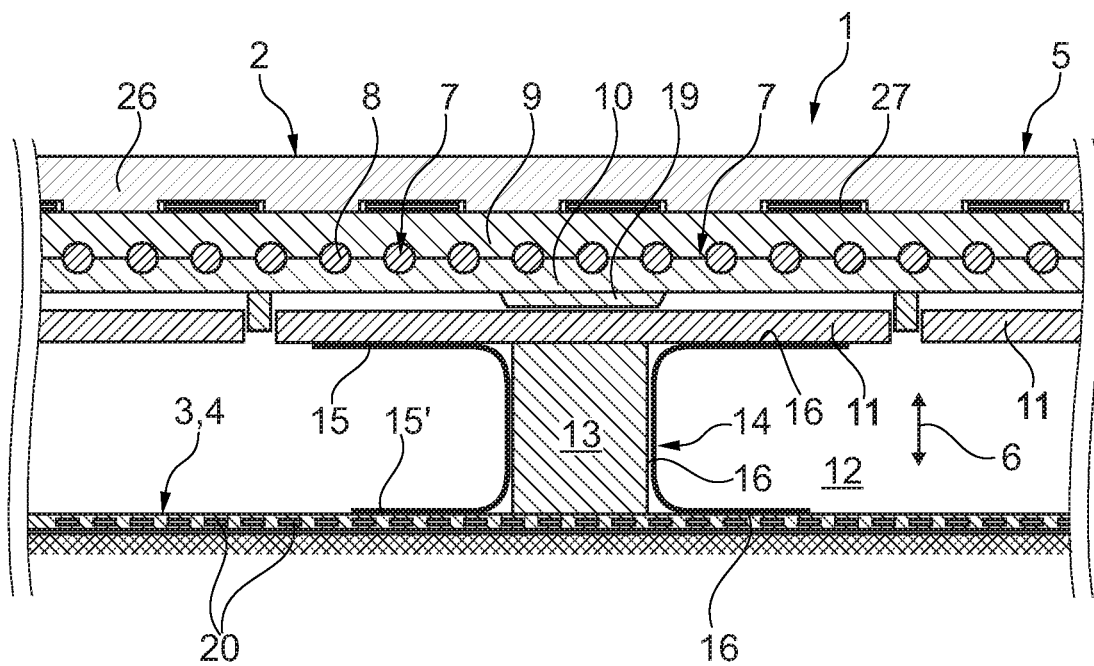
FIG. 2 shows a representation as in FIG. 1, however in the mounted state.
Figure 3:
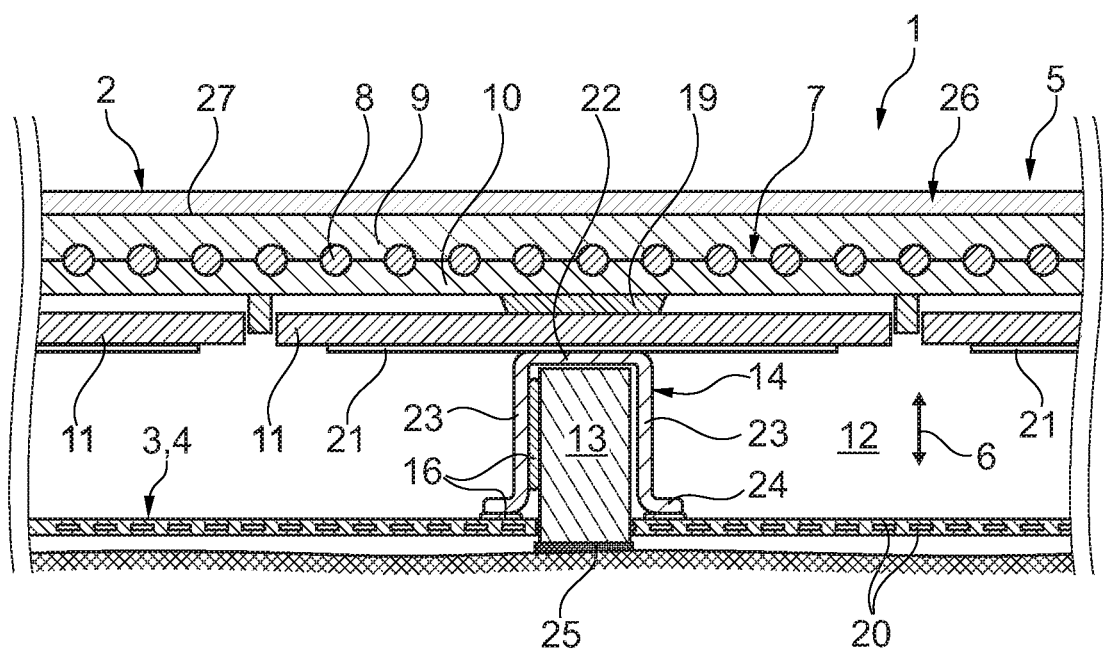
FIG. 3 shows a representation as in FIG. 1, however with another embodiment of a heat-conducting jacket.

According to FIGS. 1 to 3, a ground assembly 1 according to the invention for an inductive charging device 2 for inductively charging a motor vehicle parked on a ground 5 and not designated in more detail comprises a base plate 4 formed as cooling plate 3, which extends plate-like transversely to a distance direction 6. Likewise provided is at least one flat coil 7 which comprises a helically wound conductor 8 and is spaced apart from the base plate 4 in the distance direction 6. Here, the conductor 8 is inserted between an upper stranded wire carrier 6 and a lower stranded wire carrier 10. Likewise provided is at least one core body 11, which can be formed for example ferrite plate, and extends plate-like transversely to the distance direction 6. Between the at least one core body 11 and the base plate 4, a lower hollow space 12 is formed. The flat coil 7 or the core body 11 is supported by a support 13 which is arranged between the core body 11 and the base plate 4 and extends through the hollow space 12 in the distance direction 6. According to the invention, at least one heat-conducting jacket 14 is now provided, which connects the core body 11, that is for example the ferrite plate, and the base plate 4 in a heat-transmitting manner and surrounds at least one support 13 in the manner of a jacket. By way of the heat-conducting jacket 14, a heat dissipation of the core body 11 and thus a cooling of the same is thus possible, as a result of which a charging power of the charging device 2 can be increased.

Figure 4:
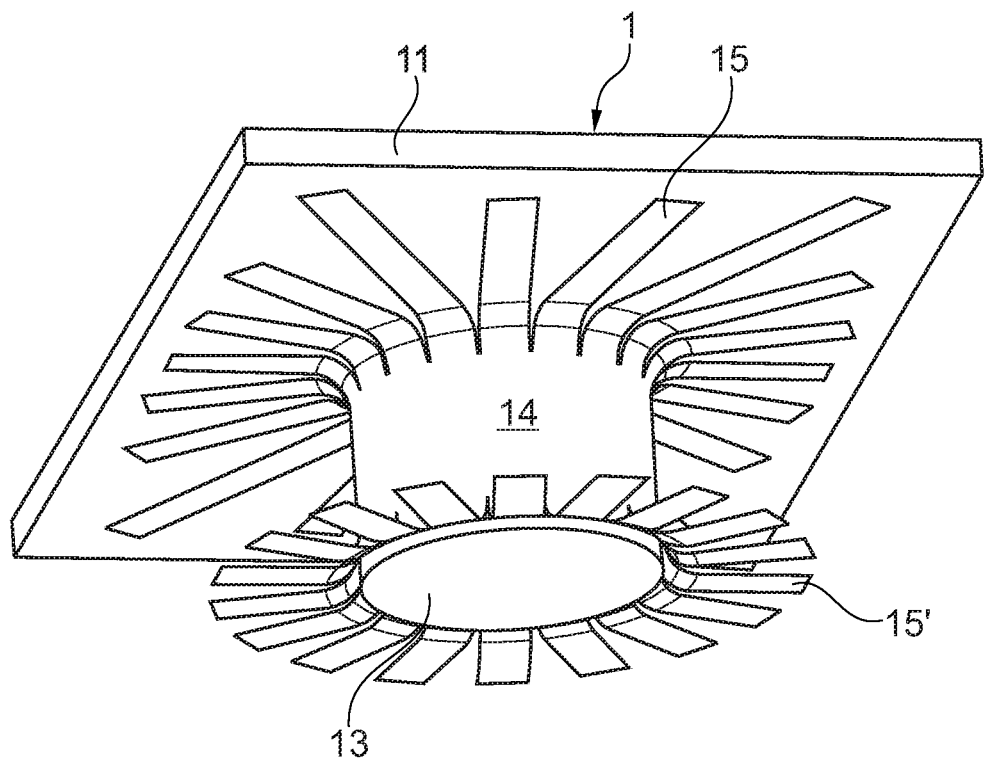
FIG. 4 shows a view from below of a possible embodiment of a heat-conducting jacket.

The heat-conducting jacket 14 can be formed out of a material having a heat conductivity of $\lambda > 50$ W/(m·K), preferentially out of a material having a heat conductivity of $\lambda > 100$ W/(m·K). Through the comparatively central arrangement of the support 13 with respect to the core body 11, the heat-conducting jacket 14 can, purely theoretically, also be formed out of a metallic material, since in the central region of the core body 11 an interference of a magnetic field does not occur or only marginally so. Viewing the heat-conducting jacket 14 according to FIG. 4 it is noticeable that the same is connected via radially projecting arms 15 with the core body 11 and via likewise radially projecting arms 15', with the base plate 4 in a heat-transmitting manner. As material for the heat-conducting jacket 14, copper or aluminium is possible for example, wherein as high as possible a heat conductivity is aimed at.

In order to be able to achieve that the heat-conducting jacket 14 lies against the base plate 14, the support 13 and the core body 11 to be cooled in as close and flat as possible a manner, it is also conceivable that the heat-conducting jacket 14 is formed as a film.

The at least one support 13 can be formed out of almost any material, for example out of plastic, as a result of which a weight-optimised and light-weight design is possible. Alternatively it is also conceivable that the support 13 is formed at least partially out of graphite or out of ceramic, in particular out of aluminium nitride or aluminium silicide, or at least partially out of metal, in particular out of aluminium. A metallic formation of the support 13 is also conceivable since the same is arranged in the central region of the respective core body 11 to be supported, in which a magnetic field that may be present is small or not present at all.

In order to further improve the connection of the heat-conducting jacket 14 at least to the base plate 4 and to the core body 11 to be cooled, a so-called thermal interface material (TIM) 16 can also be provided, wherein the thermal interface material 16 comprises for example a heat-conducting adhesive, a heat-conducting paste or an adhesive film with a heat conductivity of $\lambda > 0.8$ W/(m·K). By way of such a thermal interface material 16, which additionally makes possible an adhesive connection between the heat-conducting jacket 14 and the core body 11 or the base plate 4, a reliable fixing of the heat-conducting jacket 14 on the core body 11, on the base plate 4 and if applicable also on the support 13 can be additionally achieved.

Viewing FIG. 1 it is noticeable that there the ground assembly 1 according to the invention during an assembly state is shown, in which the arms 15' are already connected flat by way of for example the thermal interface material 16 to the base plate 4 and the heat-conducting jacket 14 in addition to the support 13 via such a thermal interface material 16. On the upper arms 15, such a thermal interface material 16 is already applied wherein the outer ends of the arms 15 are bent over as a result of which a simplified assembly can be achieved. Following the mounting of the ground assembly 1 according to the invention, as is shown according to FIG. 2, the core body 11 is supported on the support 13 and is supported by the same and the arms 15 lie flat against the lower side of the respective core body 11 to be cooled and thus in heat-transmitting manner.

In a further advantageous embodiment of the ground assembly 1 according to the invention, a pin 17 projecting in the direction of the core body 11 in the distance direction 7 can be provided on the base plate 4 and an opening 18 formed complementarily thereto on the associated support 13. By way of this, a pre-fixing during the assembly of the support 13 on the base plate 4 is comparatively easily possible, as is a pre-defined orientation. A fixing can likewise take place by way of an adhesive layer arranged between the support 13 and the base plate 4, for example a thermal interface material 16. By way of the pin 17 and the associated opening 18, a predefined rotational orientation of the support 13 relative to the base plate 4 can be enforced in the case of a cross-section of the pin that is other than round. By way of suitable chamfers arranged on an edge of the opening 18 an introduction of the pin 17 into the respective opening 18 of the support 13 can be facilitated. In order to be able to achieve an optimised discharge of mechanical loads, at least one pressure pedestal 19 arranged co-axially to the associated support 13 can be provided on the lower stranded wire carrier 10, via which pressure pedestal 19 the lower stranded wire carrier 10 and thus also the flat coil 7 is supported on the associated core body 11. By way of this it can be ensured that the core body 11 is exclusively subjected to pressure loads and no bending loads by way of the pressure pedestal 19.

The base plate 4 according to FIGS. 1 to 3 comprises at least one cooling channel 20 for a coolant, as a result of which an active cooling of the base plate 3 and via the heat-conducting jackets 14 also of the respective core body 11 and thus of the charging device 2 is possible. The base plate 4 itself can be formed out of metal, in particular out of metal, in particular out of aluminium.

Viewing FIG. 3 it is noticeable that between the support 13 and the associated core body 11 supported by the support 13 a distributor plate 21 is arranged, wherein the distributor plate 21 is connected to the core body 11 via an adhesive layer that is not designated in more detail consisting of a material having a heat conductivity of λ>0.8 W/(m·K) and/or a shear modulus of G<10 MPa. By way of such a distributor plate 21, both a mechanical fixing and also an improved heat dissipation are possible.

Viewing the heat-conducting jacket 14 according to FIG. 3 it is noticeable that the same is formed cup-shaped, having a bottom 22 arranged between core body 11 and support 13, a jacket 23 (left in FIG. 3) lying flat against the support 13 in a heat-transmitting manner and an edge 24 lying flat against the base plate in a heat-transmitting manner. On the right, the jacket 23 does not lie against the support 13 so that here a heat dissipation takes place exclusively via the heat-conducting jacket 14. A thermal coupling between jacket 23 and support 13 or between edge 24 of the heat-conducting jacket 14 and the base plate 4 can likewise take place in turn via a so-called thermal interface material 16.

According to FIG. 3, the support 13 penetrates the base plate 4 so that in this case applying a thermal interface material 16 between the jacket 23 and the support 13 is usually refrained from. Such a penetration of the base plate 4 can be utilised for example for an individual supporting of the ground assembly 1 according to the invention, in particular also for the levelling of any existing irregularities. In this case, the support 13 does not support itself on the base plate 4 but for example directly on the ground via its own mortar layer 25.

An air flow path can lead for example through the lower hollow space 12, wherein in the lower hollow space 12 an electronic component that is not designated in more detail can be additionally arranged, which can be cooled by an airstream flowing in the air flow path. By directly arranging the heat-conducting jacket 14 on the support 13, the lower hollow space 12 remains free of heat-conducting elements, which signifies advantages with respect to the available installation space. The ground assembly 1 comprises on a side of the flat coil 7 facing away from the base plate 4 and spaced apart from the same in the distance direction 6 a cover plate 26, wherein between the flat coil 7 and the cover plate 26 circuit boards 27 (see FIGS. 1 and 2) can be arranged in suitable hollow spaces.

In an alternative embodiment it is also conceivable that between the cover plate 26 and the stranded wire carrier 9 only a large, closed circuit board 27 is installed, as is shown according to FIG. 3. Such a circuit board 27 is then embodied with a mechanical strength which allows that a load present on the cover plate 26 (for example a vehicle situated thereon) can be passed on through this circuit board 27 to the support structure situated below the circuit board 27 and consisting of at least stranded wire carrier 9, core body 11 and support 13, without being itself damaged in the process.

All in all, a comparatively light-weight ground assembly 1 can be created with the ground assembly 1 according to the invention, which via the heat-conducting jackets 14 additionally makes possible an effective cooling of the core bodies 11 and thereby of the flat coil 7, as a result of which a comparatively high charging power can be achieved. All in all, the ground assembly 1 according to the invention has a comparatively simple design structure which is additionally cost-effective.

With the ground assembly 1 according to the invention, multiple advantages can be achieved:

improved heat dissipation and loading of the core bodies 11 and thus long service life and low breakage risk of the same, no additional active components for improving the heat transport, in particular no air flow, thinner construction of the thermal connection by using heat-conducting jackets 14, in particular out of metal, free installation space for electronic components including fastening possibilities for electronic components, simple and cost-effective structure, can be flexibly adapted to power class and ambient conditions, function integration of electromagnetics-electronics-thermic-mechanics.

The invention claimed is:

1. A ground assembly for an inductive charging device for inductively charging a motor vehicle parked on a surface, the ground assembly comprising:

a base plate formed as a cooling plate which extends plate-like transversely to a distance direction;

at least one flat coil including a helically wound conductor, the at least one flat coil arranged spaced apart from the base plate in the distance direction;

at least one core body extending plate-like transversely to the distance direction;

a lower hollow space formed between the at least one core body and the base plate;

at least one support disposed between the at least one core body and the base plate, the at least one support extending in the distance direction through the lower hollow space; and at least one heat-conducting jacket connecting the at least one core body and the base plate in a heat-transmitting manner and surrounding the at least one support in a jacket-like manner.

2. The ground assembly according to claim 1, wherein the at least one heat-conducting jacket is formed of a material having a heat conductivity that is greater than 50 W/(m·K).

3. The ground assembly according to claim 1, wherein the at least one support is at least partially formed of at least one of a plastic, graphite, a ceramic, and a metal.

4. The ground assembly according to claim 1, wherein the at least one heat-conducting jacket includes at least one of copper, aluminium, and graphite.

5. The ground assembly according to claim 1, wherein the at least one heat-conducting jacket is connected in a heat-transmitting manner to at least one of the base plate, the at least one support, and the at least one core body.

6. The ground assembly according to claim 1, wherein the at least one heat-conducting jacket includes at least one of:

a plurality of first arms projecting radially from the at least one heat-conducting jacket and establishing a flat, heat-transmitting connection between the at least one heat-conducting jacket and the at least one core body; and a plurality of second arms projecting radially from the at least one heat-conducting jacket and establishing a flat, heat-transmitting connection between the at least one heat-conducting jacket and the base plate.

7. The ground assembly according to claim 1, wherein the at least one heat-conducting jacket is connected to at least the base plate and the at least one core body via a thermal interface material having a heat conductivity that is greater than 0.80 W/(m·K).

8. The ground assembly according to claim 7, wherein the thermal interface material is at least one of an adhesive, a heat-conducting paste, and an adhesive film.

9. The ground assembly according to claim 1, further comprising:
a pin projecting from the base plate in the distance direction; and
an opening disposed in the at least one support, the opening formed complementarily to the pin.

10. The ground assembly according to claim 1, wherein:
the at least one flat coil further includes an upper stranded wire carrier and a lower stranded wire carrier;
the lower stranded wire carrier includes at least one pressure pedestal arranged co-axially to the at least one support; and
the lower stranded wire carrier is supported on the at least one core body via the at least one pressure pedestal.

11. The ground assembly according to claim 1, wherein the base plate includes at least one cooling channel for a coolant.

12. The ground assembly according to claim 1, further comprising a distributor plate arranged between the at least one support and the at least one core body.

13. The ground assembly according to claim 12, wherein the distributor plate is connected to the at least one core body via an adhesive layer composed of a material having at least one of:
a heat conductivity that is greater than 0.8 W/(m·K); and
a shear modulus that is less than 10 MPa.

14. The ground assembly according to claim 1, wherein:
the at least one support penetrates the base plate; and
the at least one heat-conducting jacket is cup-shaped having:
a bottom arranged between the at least one core body and the at least one support;
a jacket surrounding the at least one supports; and
an edge lying flat against the base plate in a heat-transmitting manner.

15. The ground assembly according to claim 1, wherein at least one of:
an air flow path extends through the lower hollow space; and
at least one electronic component is arranged in the lower hollow space.

16. The ground assembly according to claim 1, further comprising:
a cover plate disposed on a side of the at least one flat coil facing away from the base plate and disposed spaced apart from the at least one flat coil in the distance direction; and
a circuit board arranged between the at least one flat coil and the cover plate.

17. The ground assembly according to claim 1, wherein the at least one heat-conducting jacket is structured as a film.

18. The ground assembly according to claim 1, wherein the base plate is at least partially composed of a metal.

19. A ground assembly for an inductive charging device for inductively charging a motor vehicle parked on a surface, the ground assembly comprising:
a base plate structured as a cooling plate;
a flat coil arranged spaced apart from the base plate the flat coil including a helically wound conductor;
a core body;
a support extending between the core body and the base plate such that a lower hollow space is defined between the core body and the base plate; and
a heat-conducting jacket at least partially surrounding the support;
wherein the heat-conducting jacket includes:
a plurality of first arms projecting radially from the heat-conducting jacket and establishing a flat, heat-transmitting connection between the heat-conducting jacket and the core body; and
a plurality of second arms projecting radially from the heat-conducting jacket and establishing a flat, heat-transmitting connection between the heat-conducting jacket and the base plate.

20. A ground assembly for an inductive charging device for inductively charging a motor vehicle parked on a surface, the ground assembly comprising:
a base plate structured as a cooling plate;
a flat coil arranged spaced apart from the base plate the flat coil including a helically wound conductor;
a plurality of core bodies;
a plurality of supports that each extend between an associated core body of the plurality of core bodies and the base plate such that a lower hollow space is defined between the plurality of core bodies and the base plate;
a plurality of heat-conducting jackets each at least partially surrounding an associated support of the plurality of supports; and
wherein the plurality of heat-conducting jackets each connect an associated core body of the plurality of core bodies and the base plate in a heat-transmitting manner.

* * * * *